United States Patent
Desmet et al.

(10) Patent No.: US 11,553,647 B2
(45) Date of Patent: Jan. 17, 2023

(54) CHAFF/STRAW SPREADER SYSTEM OF AN AGRICULTURAL HARVESTER

(71) Applicant: CNH Industrial America LLC, New Holland, PA (US)

(72) Inventors: Stefaan Desmet, Vosselare (BE); Tom N. N. Somers, Aalter (BE); Geert Nerinckx, Aaigem (BE)

(73) Assignee: CNH Industrial America LLC, New Holland, PA (US)

( * ) Notice: Subject to any disclaimer, the term of this patent is extended or adjusted under 35 U.S.C. 154(b) by 523 days.

(21) Appl. No.: 16/620,867

(22) PCT Filed: Jun. 5, 2018

(86) PCT No.: PCT/EP2018/064798
§ 371 (c)(1),
(2) Date: Dec. 9, 2019

(87) PCT Pub. No.: WO2018/224510
PCT Pub. Date: Dec. 13, 2018

(65) Prior Publication Data
US 2020/0196525 A1    Jun. 25, 2020

(30) Foreign Application Priority Data
Jun. 9, 2017   (BE) .................................. 2017/5412

(51) Int. Cl.
*A01D 41/12* (2006.01)
*A01F 12/40* (2006.01)

(52) U.S. Cl.
CPC .......... *A01D 41/1243* (2013.01); *A01F 12/40* (2013.01)

(58) Field of Classification Search
CPC ............................ A01D 41/1243; A01F 12/40
See application file for complete search history.

(56) References Cited

U.S. PATENT DOCUMENTS

| 5,082,186 A * | 1/1992 | Bruns | A01D 41/1243 239/673 |
| 9,370,141 B2 * | 6/2016 | Isaac | A01D 41/1243 |
| 2006/0246965 A1 | 11/2006 | Lauer et al. | |

(Continued)

OTHER PUBLICATIONS

International Search Report and Written Opinion for Application No. PCT/US2018/064798 dated Aug. 1, 2018 (13 pages).

*Primary Examiner* — Manuel A Rivera Vargas
*Assistant Examiner* — Yaritza H Perez Bermudez
(74) *Attorney, Agent, or Firm* — Peter Zacharias; Patrick Sheldrake (57) ABSTRACT

A spreader system for use in an agricultural harvester having a threshing system and a cleaning system. The spreader system includes a chopper for the chopping of straw from the threshing system and a chaff spreader system and a straw spreader system. The chaff spreader system is configured to receive a flow of chaff from the cleaning system; and the straw spreader system is configured to receive a flow of straw from the chopper. The chaff spreader system is configured to emit a chaff airflow stream in a first flow path, and the straw spreader system is configured to emit a straw airflow stream in a second flow path. The first flow path and the second flow path intersect at a place of confluence apart from the chaff spreader system and the straw spreader system.

13 Claims, 5 Drawing Sheets

(56) References Cited

U.S. PATENT DOCUMENTS

| | | | |
|---|---|---|---|
| 2007/0015556 A1* | 1/2007 | Johnson | A01D 41/1243 460/111 |
| 2007/0256403 A1 | 11/2007 | Teroerde et al. | |
| 2010/0120482 A1* | 5/2010 | Holmen | A01D 41/1243 460/112 |
| 2016/0073586 A1* | 3/2016 | Biggerstaff | A01F 17/04 460/112 |
| 2016/0374270 A1* | 12/2016 | Maes | A01F 12/00 460/149 |
| 2017/0094903 A1* | 4/2017 | Baes | A01F 12/48 |
| 2017/0105350 A1* | 4/2017 | Ricketts | A01F 12/20 |
| 2017/0112065 A1* | 4/2017 | Reinecke | A01F 7/062 |
| 2018/0343805 A1* | 12/2018 | Faulkner | A01F 12/40 |
| 2019/0059232 A1* | 2/2019 | Ricketts | A01F 12/444 |
| 2019/0059233 A1* | 2/2019 | Bilde | A01F 12/444 |
| 2020/0045883 A1* | 2/2020 | De Baere | A01D 41/1243 |

* cited by examiner

CHAFF/STRAW SPREADER SYSTEM OF AN AGRICULTURAL HARVESTER

BACKGROUND OF THE INVENTION

The present invention relates to agricultural harvesters, and, more specifically to residue spreader systems used with such harvesters.

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

During the process of harvesting with a combine, the desired grain is gathered and saved while crop material other than the desired grain is expelled from the combine. The non-grain crop material, crop residue, or material other than grain (MOG) is usually derived from two areas in the combine, the threshing rotor and the cleaning system. The material expelled from the threshing rotor is generally referred to as straw and includes much of the larger plant material such as stalks, stems, cobs, leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

Residue spreaders can be of horizontal and vertical types. A horizontal spreader includes a spreader device with a rotor driven on a generally vertical axis and a plurality of vanes or paddles on the rotor to propel residue in a wide swath behind the combine. Commonly, two such side-by-side rotors are used, the rotors rotating in opposite directions within a housing. After being chopped, the crop residue enters the rotor area through a vertical inlet in the spreader housing, and as the paddles rotate about the axis the residue is propelled towards a tangential outlet of the housing. Typically, the tangential outlet of the housing is formed by a deflector whose orientation and shape influences the spread pattern of the crop residue. It is known to use adjustable structures of the housing and deflector to control the outlet flow of material, by adjusting the size and position of the deflector and of the space between the rotor paddles and the adjustable structures, to distribute the crop residue material across the width of a distribution swath behind the combine. It is desirable to achieve an even distribution of material for more even and consistent residue material breakdown and to facilitate subsequent field tilling and seeding operations.

A vertical spreader includes a rotor driven about a generally horizontal axis and a plurality of vanes or paddles are on the rotor to propel residue from the spreader housing. Again, commonly two such side-by-side rotors are used, rotating in opposite directions.

As combine harvesters increase in size and crop processing capability, the width of the header of the combine can increase in order to make fewer passes in a field. As the width of the header increases, so too must the spread width of crop residue behind the combine in order to uniformly cover the field which now is mostly bare of crops. The spread width can be adjusted, for example, by increasing the rotational speed of the rotors and paddles so the crop material is spread a greater distance from the spreader system. The positioning of the deflector is controlled to prevent, for example, crop residue being spread onto standing crop, which would then be collected and reprocessed by the combine.

One particular problem that arises with greater spread widths is the creation of "stripes" of high and low volumes of crop residue along the driving direction of the combine in hard crop conditions. The stripes of high and low crop residue volumes are an uneven thickness of the crop residue, with higher thickness of the crop residue resulting in a high volume stripe and lower thickness of the crop residue resulting in a low volume stripe. The stripes of crop residue distribution can lead to some areas of the field being practically bare of crop residue, with little added nutrients from the residue, while other areas of the field have excess crop residue that can interfere with seeding and tilling.

What is needed in the art is a crop residue spreader that will uniformly distribute the crop residue across the full cut width of the combine.

SUMMARY OF THE INVENTION

The present invention provides a residue spreading system for use by agricultural harvesters.

The invention in one form is directed to spreader system for use in an agricultural harvester having a threshing system and a cleaning system. The spreader system includes a chopper, a chaff spreader system and a straw spreader system. The chaff spreader system is configured to receive a flow of chaff from the cleaning system; and the straw spreader system is configured to receive a flow of straw from the chopper. The chaff spreader system is configured to emit a chaff airflow stream in a first flow path, and the straw spreader system is configured to emit a straw airflow stream in a second flow path. The first flow path and the second flow path intersect at a place of confluence apart from the chaff spreader system and the straw spreader system.

In another embodiment of the invention the chaff spreader system includes a right blower configured to emit a right portion of the chaff airflow stream, and a left blower configured to emit a left portion of the chaff airflow stream. The straw spreader system includes a right thrower configured to emit a right portion of the straw airflow stream, and a left thrower configured to emit a left portion of the straw airflow stream.

In a further embodiment the blowers and the throwers of the spreader system have generally vertical rotation axes and are configured for rotation thereabout.

In yet another embodiment the blowers of the spreader system are configured to rotate in counter-rotational directions to each other and the throwers are configured to rotate in counter-rotational directions to each other.

In still yet another embodiment the second flow path of the spreader system is generally perpendicular to a longitudinal axis of the spreader system.

In still yet another embodiment the first flow path of the spreader system is at an obtuse angle to the longitudinal axis.

In still yet another embodiment the chaff airflow stream of the spreader system has a velocity prior to the place of confluence and the straw airflow stream has a velocity prior to the place of confluence, the velocity of the chaff airflow stream being configured to be generally slower than the velocity of the straw airflow stream.

In still yet another embodiment at the place of confluence of the spreader system the chaff airflow stream and the straw airflow stream merge and the merged flow starts along a path that generally extends along the second flow path.

In still yet another embodiment at the place of confluence of the spreader system the chaff airflow stream and the straw airflow stream exhibit increased chaotic movement.

In still yet another embodiment the throwers of the spreader system each include a plurality of rotatable V-shaped paddles.

In still yet another embodiment the V-shaped paddles of the spreader system have an upper portion and a lower portion, the upper portion having a longer dimension from the vertex than a dimension of the lower portion.

In still yet another embodiment the throwers of the spreader system each additionally include a deflector placed radially outward from the paddles, the deflector being configured to assist in directing the straw airflow stream along the second flow path.

In still yet another embodiment the deflectors of the spreader system each have a trailing corner that is proximate in height to a location of the vertices of the upper portion and the lower portion of the V-shaped paddles.

In still yet another embodiment there is an angle between the upper portion and the lower portion of the V-shaped paddles of approximately 90 degrees.

An advantage of the present invention is that knife wear of the chopper is reduced since the chaff stream does not go through the chopper.

Another advantage is that the spreading characteristics of the MOG are enhanced.

Yet another advantage is that the mixing of the higher velocity straw flow with the chaff flow extends the range of the lighter weight chaff.

A further advantage is that the random chaotic nature of the combined MOG flows occurs away from the combine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw", "chaff" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, or MOG (Material Other than Grain). The word "straw" refers to the stalk of the crop and it may be chopped before distribution on the field. The word "chaff" refers to the material that is removed during the sieve or sifting process and is generally smaller and lighter than the straw. Incompletely threshed crop material is referred to as "tailings". Also the terms "fore", "aft", "left" and "right", when used in connection with the agricultural harvester and/or components thereof are usually determined with reference to the direction of forward operative travel D of the harvester, but again, they should not be construed as limiting. The terms "longitudinal" and "transverse" are determined with reference to the fore-and-aft direction of the agricultural harvester and are equally not to be construed as limiting.

Figure 1:
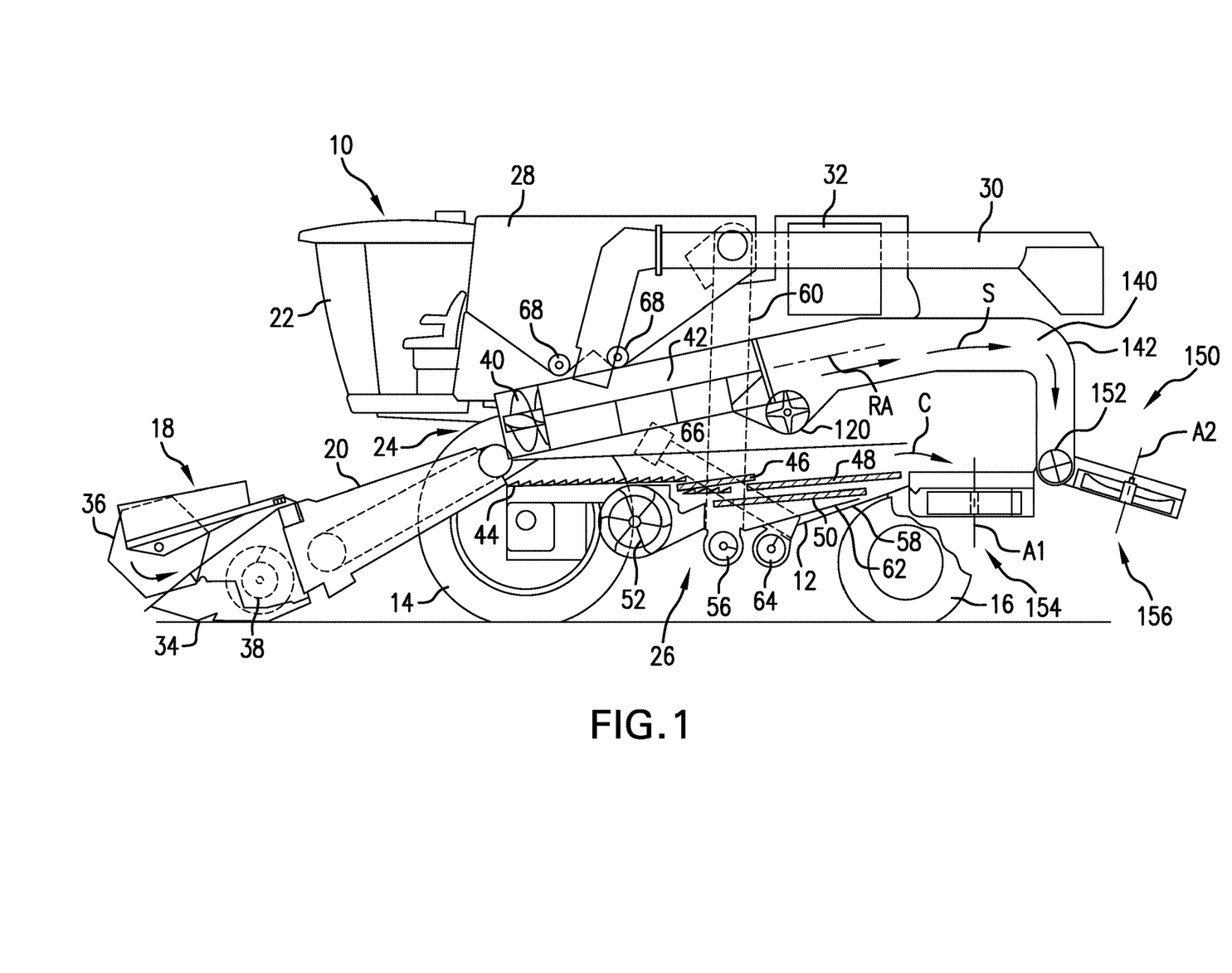
FIG. 1 is a side view of an embodiment of an agricultural harvester in the form of a combine, which includes an embodiment of a spreader system of the present invention.

Referring now to the drawings, and more particularly to FIG. 1, there is shown an exemplary embodiment of an agricultural vehicle 10 in the form of a combine 10, which is representative of a wide variety of agricultural harvesting machines. According to an aspect of the present invention, the combine 10 generally includes a chassis 12, ground engaging wheels 14 and 16, a header 18, a feeder housing 20, an operator cab 22, a threshing and separating system 24, a grain cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable about an axis RA within a corresponding perforated concave system 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward grain cleaning system 26. Cleaning system 26 may include a pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged grain elevator 60 for transport to grain tank 28. Tailings from cleaning system 26 fall to a tailings auger trough 58. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

A beater 120 is rotatable for propelling or directing a flow or stream of the plant residue, generally referred to as straw S, toward the rear of the combine 10. A cleaning system 26 receives the threshed crop component from the threshing system 24 and removes the chaff and other remaining residue such as seedpods, husks, particulates and the like, generally referred to as chaff C, and directs a flow or stream of the chaff C toward the aft end of the combine 10 toward a spreader system 150. The straw S passes through a cavity 140 toward the spreader system 150 at a lower opening of cavity 140 and enters a chopper 152. A shaped member 142 defines a boundary for the travel of straw S.

Figure 2:
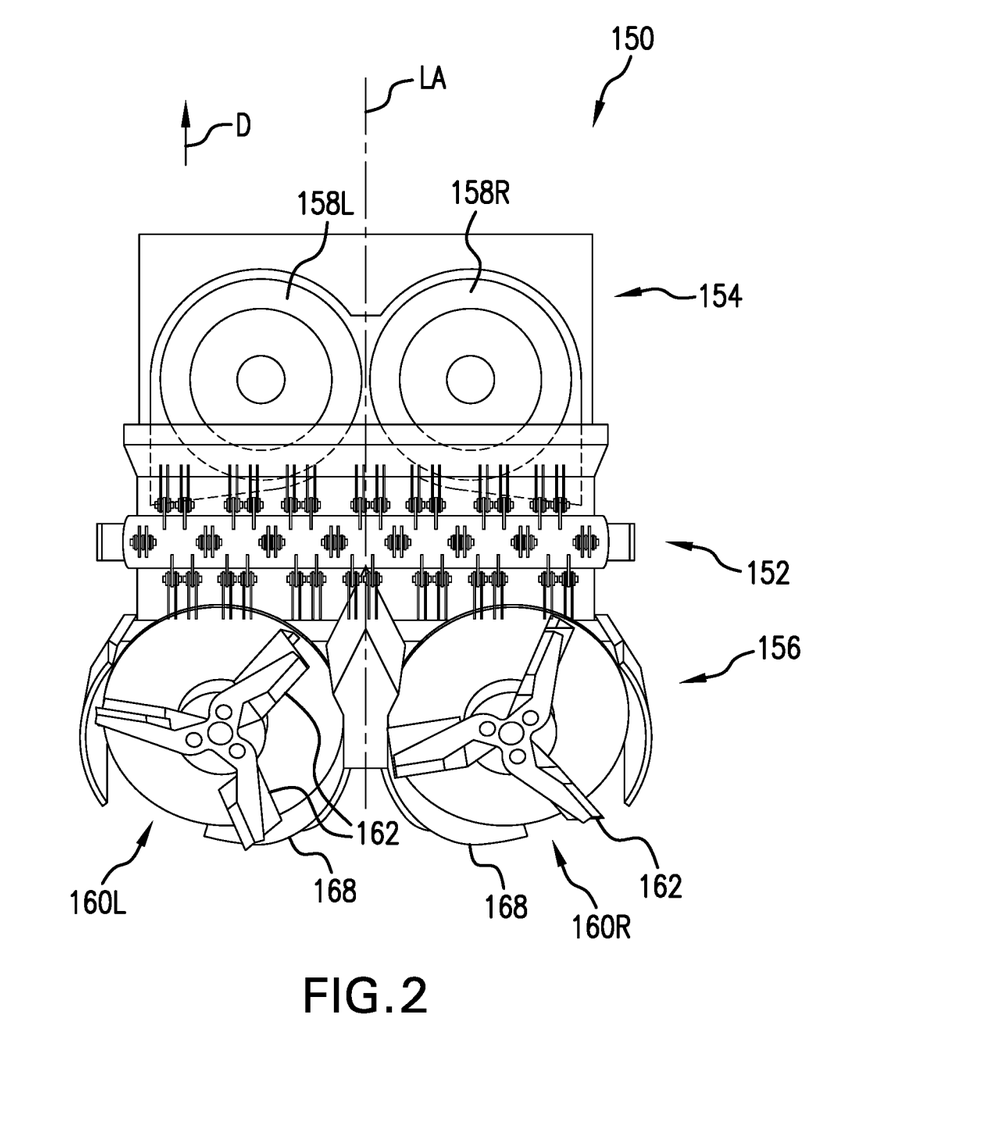
FIG. 2 is a top view of elements of the spreader system used in the harvester of FIG. 1.
Figure 3:
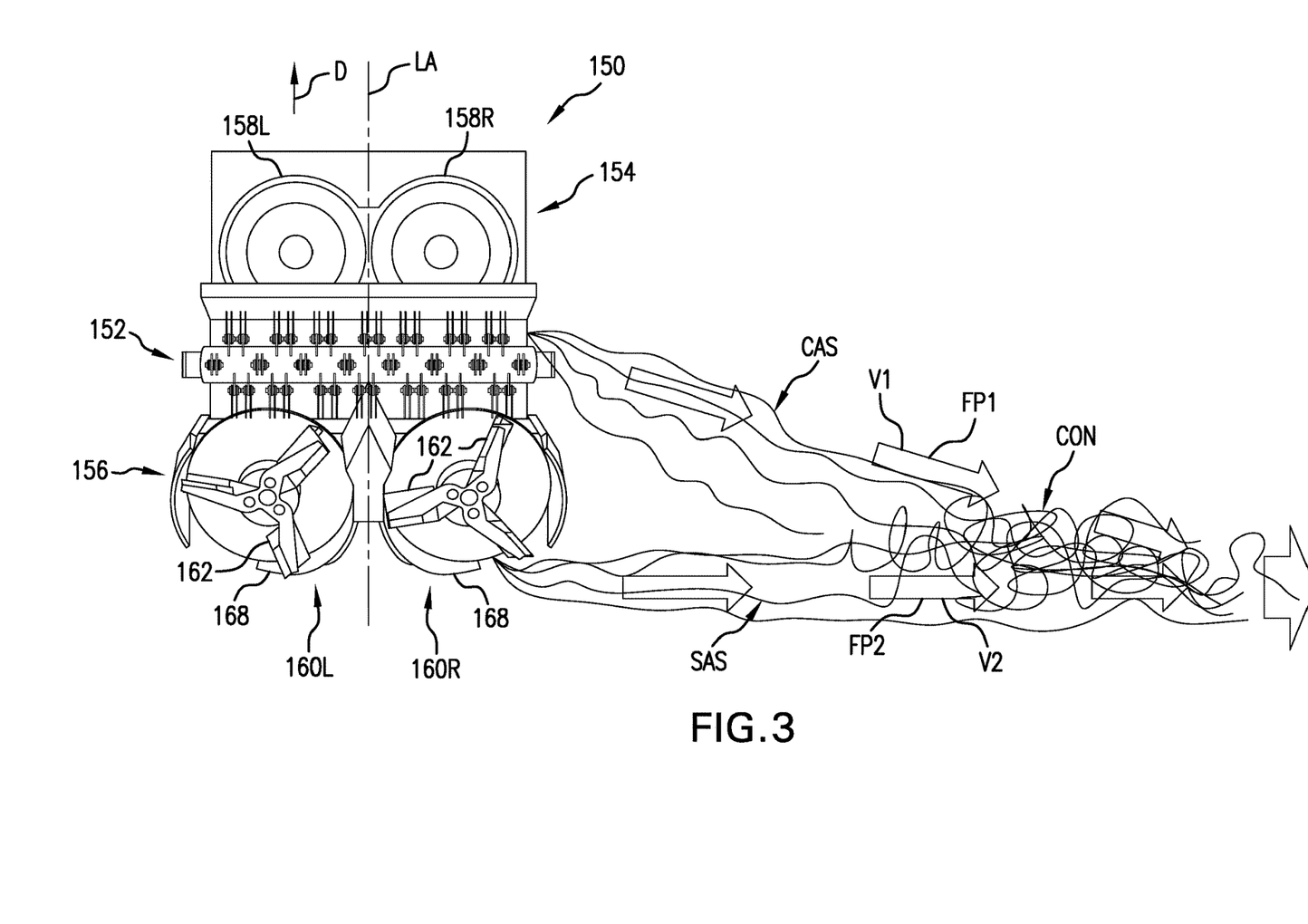
FIG. 3 is another top view of the spreader system of FIGS. 1 and 2 additionally showing the flow paths of the chaff and straw and the confluence of these flows.

Now, additionally referring to FIGS. 2 and 3, the spreader system 150 includes a chaff spreader system 154 that receives a flow of the chaff C from the cleaning system 26, and a straw spreader system 156 that receives a flow of straw S from the chopper 152. The chaff spreader system 154 emits a chaff airflow stream CAS in a first flow path FP1, while the straw spreader system 156 emits a straw airflow stream SAS in a second flow path FP2. The first flow path FP1 and the second flow path FP2 intersecting at a place of confluence CON apart from the chaff spreader system 154 and the straw spreader system 156. This meeting of the streams CAS and SAS imparts addition velocity to the chaff air stream CAS, which by its nature is composed of finer and less dense materials. The momentum of the heavier straw airflow stream SAS imparts energy to the chaff airflow stream CAS and the combined flow continues generally along second flow path FP2.

While the discussion herein is often relative to what is happening on one side of the harvester 10, the mirror image of this action is also occurring on the other side of the harvester 10.

The chaff spreader system 154 includes a right blower 158R and a left blower 158L, which are mirror images of each other and operate in a counter rotating fashion to each other about generally vertical axes A1 relative to the ground. The right blower 158R emits a right portion of the chaff airflow stream CAS, while the left blower 158L emits a left portion of the chaff airflow stream CAS. In a similar manner, the straw spreader system 156 includes a right thrower 160R that emits a right portion of the straw airflow stream SAS; and a left thrower 160L that emits a left portion of the straw airflow stream SAS. The throwers 160L and 160R each rotate about generally vertical axes A2 relative to the ground. An important aspect of the present invention is that the streams of chaff and straw CAS and SAS combine away from the harvester 10. The confluence area CON takes place at least 2 meters from the harvester 10 and preferably by 5 meters. The result of this conflux of streams CAS and SAS is so that the debris in the chaff C does not go through the chopper 152 and that the energy of the straw stream SAS can be used to carry the chaff stream CAS to a greater distance and to increase the chaotic, hence randomizing flow of the residue so that it is distributed in a uniform manner on the ground.

As can be seen in FIG. 3, the second flow path FP2 is generally perpendicular to a longitudinal axis (LA), which corresponds to the direction D in which the harvester 10 is harvesting the standing crop. It can also be seen in FIG. 3 that the first flow path FP1 is at an obtuse angle to the direction D and is directed aft so that it will encounter the straw airflow stream SAS. Generally the velocity V1 of the chaff airflow stream CAS prior to the place of confluence CON is slower than the velocity V2 of the straw airflow stream SAS, which can be as a result of the lighter weight of the chaff C that poses a higher tendency to disperse in the air. At the place of confluence CON the chaff airflow stream CAS and the straw airflow stream SAS merge and the merged material travels along a path that generally extends along the second flow path FP2, with the straw airflow stream SAS extending the distance of the chaff airflow stream CAS due to the merger of the streams. As can be seen as represented by the increased line squiggles at the confluence CON area the combination of the chaff airflow stream CAS and the straw airflow stream SAS exhibit increased chaotic movement. This chaotic movement is also a result of vortices created by the movements of the streams CAS and SAS. The bolstering of the chaff airflow stream CAS in the perpendicular direction, relative to longitudinal axis LA, helps to increase the effective distance the chaff C can travel before settling onto the ground.

Figure 4:
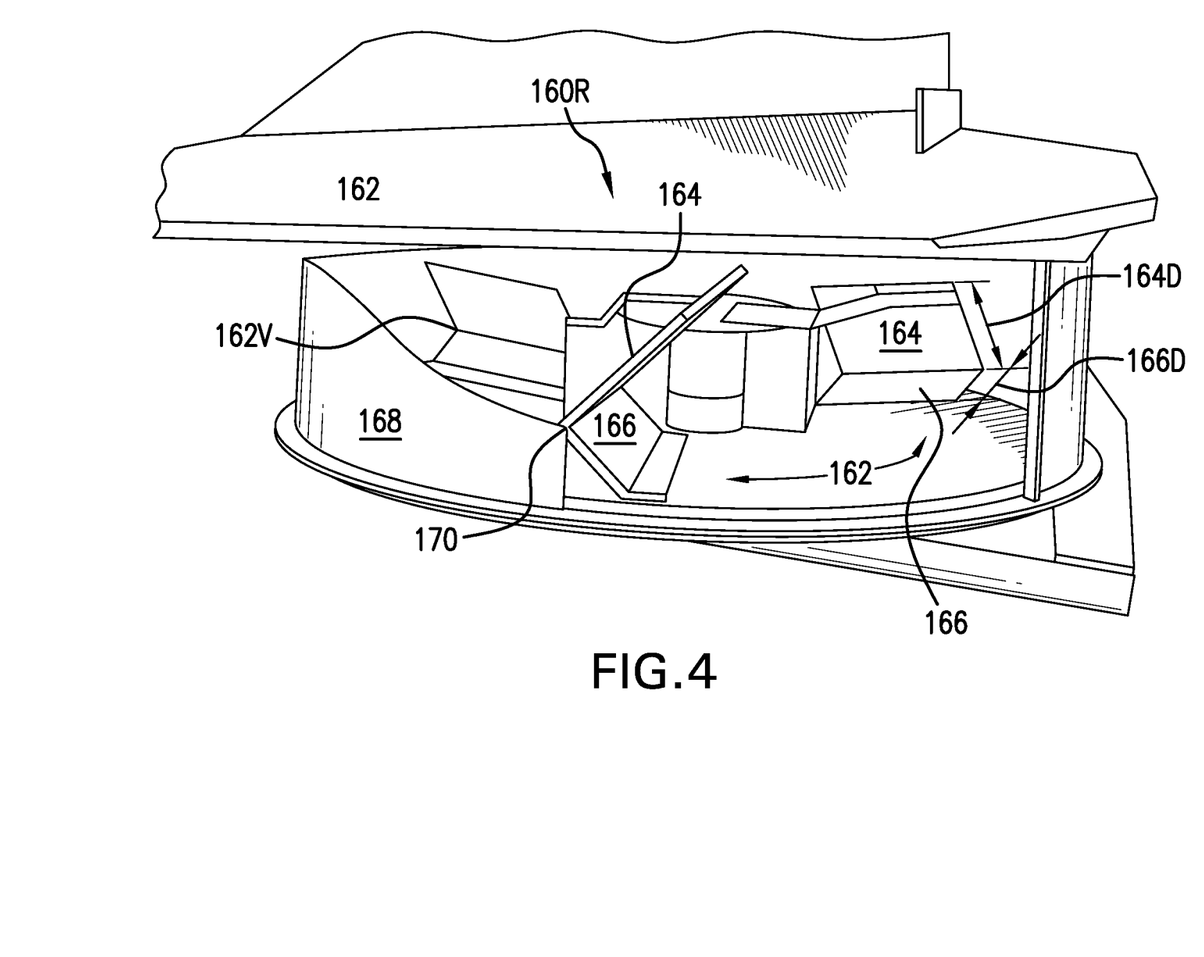
FIG. 4 is a view from the rear of the harvester of FIG. 1 illustrating details of a portion of the spreader system of FIGS. 1-3.

Now, additionally referring to FIG. 4, there is illustrated some further features of the throwers 160. The throwers 160R and 160L each include a plurality of rotatable V-shaped paddles 162. Each of the V-shaped paddles 162 have an upper portion 164 and a lower portion 166, the upper portion 164 being longer than the lower portion 166. The upper portion 164 has a length of distance 164D, which can be twice as long as distance 166D of the lower portion 166. The shape of the V-shaped paddles 162 is such that they tend to concentrate the chopped straw from the chopper 152 into clumps that are then thrown along the second flow path FP2. This clumping or concentrating serves to lower the dispersal of the clumps as they travel along the second flow path FP2 until they encounter and merge with the chaff airflow stream CAS, thereby allowing for extended travel of the chaff C in the combined flow.

The throwers 160R, 160L each additionally include a deflector 168 that is shaped to help contain the clumps forming on the V-shaped paddles 162 until they are released to travel along flow path FP2. The deflectors 168 each have a trailing corner 170 that is proximate in height to a location of the vertex 162V of the upper portion 164 and the lower portion 166 of the V-shaped paddle 162. The angle between the upper portion 164 and the lower portion 166 of the V-shaped paddles 162 is approximately 90 degrees.

Figure 5:
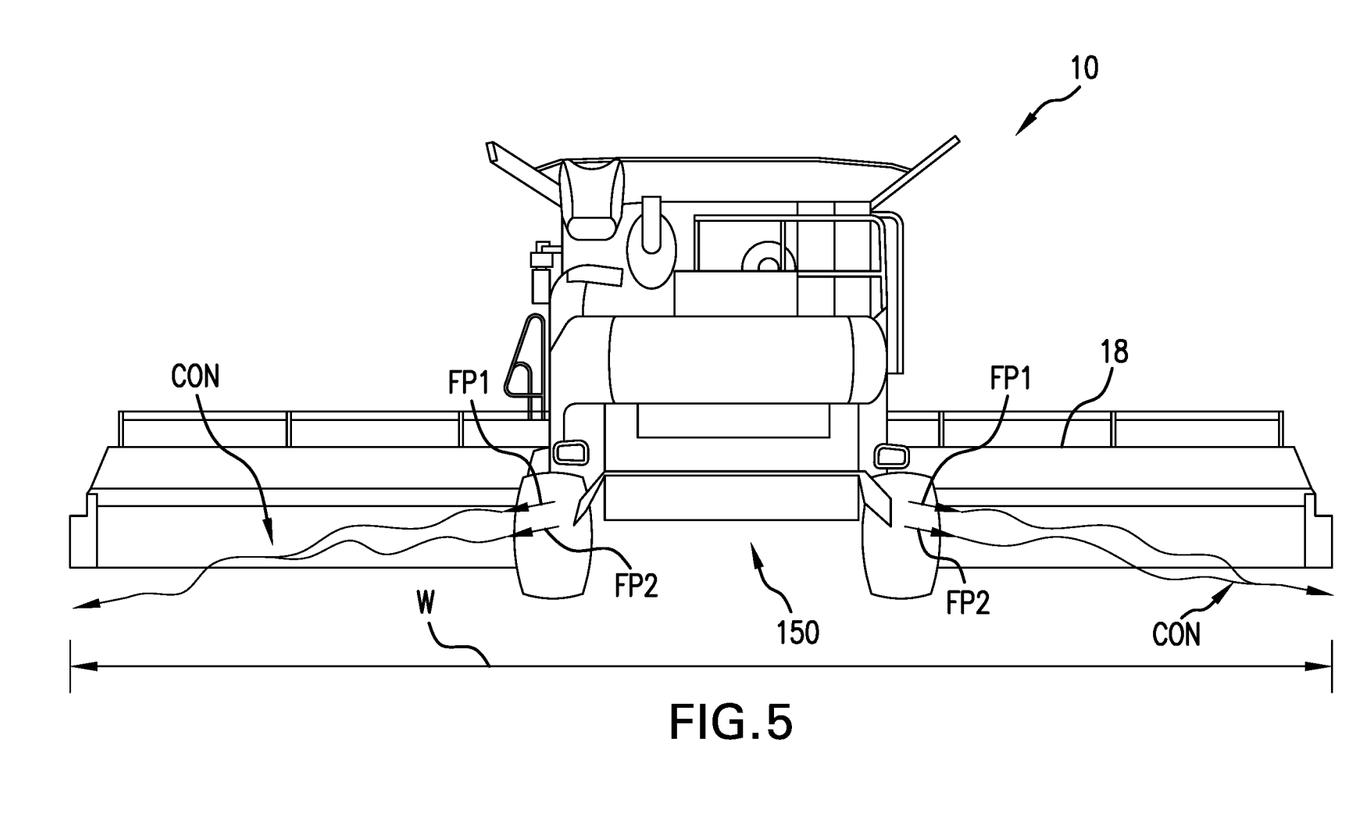
FIG. 5 is a rear view of the harvester of FIG. 1 illustrating the spreader system of FIGS. 1-4 and a flow of the MOG exiting the spreader system.

Now, further referring to FIG. 5, there can be seen the flow paths FP1 and FP2 of the MOG as it exits the spreader system 150 and is distributed relatively uniformly across the harvested width W of the crop that corresponds to the width W of the combine header 18. Right and left portions of the flow paths FP1 and FP2 are illustrated as well as the areas of confluence CON.

Advantageously the present invention reduces wear on the knives of the chopper since the chaff stream that can have abrasive elements in it, does not go through the chopper. The spreading characteristics of the MOG are enhanced, in that the chaff stream has an extended range, due to the mixing of the higher velocity straw flow with the chaff flow at a distance from the harvester. In the area of confluence the random chaotic nature of the combined MOG flows randomizes the overall flow so that the residue is more evenly spread.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A spreader system for use in an agricultural harvester having a threshing system and a cleaning system, the spreader system comprising:
   a chopper for chopping straw from the threshing system;
   a chaff spreader system configured to receive a flow of chaff from the cleaning system; and
   a straw spreader system configured to receive a flow of straw from the chopper, wherein the straw spreader system is spaced apart from the chaff spreader system in a longitudinal direction,
   wherein the chaff spreader system is further configured to eject a chaff airflow stream from the agricultural harvester along a first flow path that is oriented at an obtuse angle to the longitudinal direction, and the straw spreader system is configured to eject a straw airflow stream from the agricultural harvester along a second flow path that is oriented generally perpendicular to the longitudinal direction, the first flow path and the second flow path intersecting outside of the agricultural harvester and at a place of confluence apart from the chaff spreader system and the straw spreader system.

2. The spreader system according to claim 1, wherein the chaff spreader system comprises:
   a right blower configured to emit a right portion of the chaff airflow stream; and
   a left blower configured to emit a left portion of the chaff airflow stream, and
   wherein the straw spreader system comprises:
   a right thrower configured to emit a right portion of the straw airflow stream; and
   a left thrower configured to emit a left portion of the straw airflow stream.

3. The spreader system according to claim 2, wherein the blowers and the throwers comprise generally vertical rotation axes and are configured for rotation thereabout.

4. The spreader system according to claim 3, wherein the blowers are configured to rotate in counter-rotational directions to each other and the throwers are configured to rotate in counter-rotational directions to each other.

5. The spreader system according to claim 1, wherein the chaff airflow stream has a velocity prior to the place of confluence and the straw airflow stream has a velocity prior to the place of confluence the velocity of the chaff airflow stream being configured to be generally slower than the velocity of the straw airflow stream.

6. The spreader system according to claim 5, wherein at the place of confluence the chaff airflow stream and the straw airflow stream merge to form a merged flow, and the merged flow starts along a path that generally extends along the second flow path.

7. The spreader system according to claim 1, wherein at the place of confluence the chaff airflow stream and the straw airflow stream exhibit increased chaotic movement.

8. The spreader system according to claim 7, wherein the throwers each include a plurality of rotatable V-shaped paddles.

9. The spreader system according to claim 8, wherein the V-shaped paddles have an upper portion and a lower portion, the upper portion having a longer dimension from a vertex than a dimension of the lower portion.

10. The spreader system according to claim 9, wherein the throwers each additionally include a deflector placed radially outward from the paddles, the deflector being configured to assist in directing the straw airflow stream along the second flow path.

11. The spreader system according to claim 10, wherein the deflectors each have a trailing corner that is proximate in height to a location of the vertices of the upper portion and the lower portion of the V-shaped paddles.

12. The spreader system according to claim 11, wherein an angle between the upper portion and the lower portion of the V-shaped paddles is approximately 90 degrees.

13. An agricultural harvester comprising a spreader system according to claim 1, wherein the agricultural harvester is an agricultural combine.

* * * * *